(12) United States Patent
Dyllick-Brenzinger et al.

(10) Patent No.: US 7,709,052 B2
(45) Date of Patent: May 4, 2010

(54) AQUEOUS POLYMER DISPERSIONS CONTAINING ALKYLDIKETENES, METHODS FOR THE PRODUCTION THEREOF, AND THEIR USE

(75) Inventors: Rainer Dyllick-Brenzinger, Speyer (DE); Roland Ettl, Hassloch (DE); Franca Tiarks, Ludwigshafen (DE); Ulrich Riebeling, Schifferstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 977 days.

(21) Appl. No.: 10/529,782

(22) PCT Filed: Oct. 9, 2003

(86) PCT No.: PCT/EP03/11145

§ 371 (c)(1),
(2), (4) Date: Mar. 30, 2005

(87) PCT Pub. No.: WO2004/037867

PCT Pub. Date: May 6, 2004

(65) Prior Publication Data

US 2006/0009571 A1 Jan. 12, 2006

(30) Foreign Application Priority Data

Oct. 18, 2002 (DE) ............... 102 48 879

(51) Int. Cl.
*C08F 212/00* (2006.01)
*C08J 3/00* (2006.01)
*C08F 2/00* (2006.01)

(52) U.S. Cl. ............... 427/180; 427/288; 427/407.1; 427/411; 427/412; 427/412.1; 525/54.3; 525/54.31; 526/72; 526/89; 526/200; 526/201; 526/207; 526/209; 526/212; 526/216; 526/286; 526/288; 526/303.1; 526/304; 526/307.2; 526/307.4; 526/317.1; 526/318; 526/318.3; 526/318.4; 526/318.42; 526/318.44; 526/318.45; 526/318.5; 526/318.6; 526/319; 526/328; 526/328.5; 526/329.2; 526/329.3; 526/329.7; 526/330; 526/332; 526/341

(58) Field of Classification Search ............... 525/54.3, 525/54.31; 526/72, 89, 200, 201, 207, 209, 526/212, 216, 286, 288, 303.1, 304, 307.2, 526/307.4, 317.1, 318, 318.3, 318.4, 318.42, 526/318.44, 318.45, 318.5, 318.6, 319, 328, 526/328.5, 329.2, 329.3, 329.7, 330, 332, 526/341; 427/180, 288, 407.1, 411, 412, 427/412.1

See application file for complete search history.

(56) References Cited

U.S. PATENT DOCUMENTS 3,223,544 A 12/1965 Savina

FOREIGN PATENT DOCUMENTS

| EP | 1 245 587 | 10/2002 |
|---|---|---|
| JP | 04 100994 | 4/1992 |
| WO | 94/05855 | 3/1994 |
| WO | 96/31650 | 10/1996 |
| WO | 00/23651 | 4/2000 |
| WO | 01/36491 | 5/2001 |

OTHER PUBLICATIONS

Landfester, Katharina. "Polyreactions in Miniemulsions", Macromol. Rapid Commun., vol. 22, No. 12, pp. 896-936 2001.

*Primary Examiner*—Ana L Woodward
(74) *Attorney, Agent, or Firm*—Oblon, Spivak, McClelland, Maier & Neustadt, L.L.P.

(57) ABSTRACT

Alkyldiketene-containing aqueous polymer dispersions which are obtainable by miniemulsion polymerization of hydrophobic monoethylenically unsaturated monomers in the presence of alkyldiketenes, processes for the preparation of such polymer dispersions and the use of the thus obtainable dispersions as sizes for paper or as water repellents for leather, natural and/or manmade fibers and textiles.

37 Claims, 3 Drawing Sheets

Figure 1A:
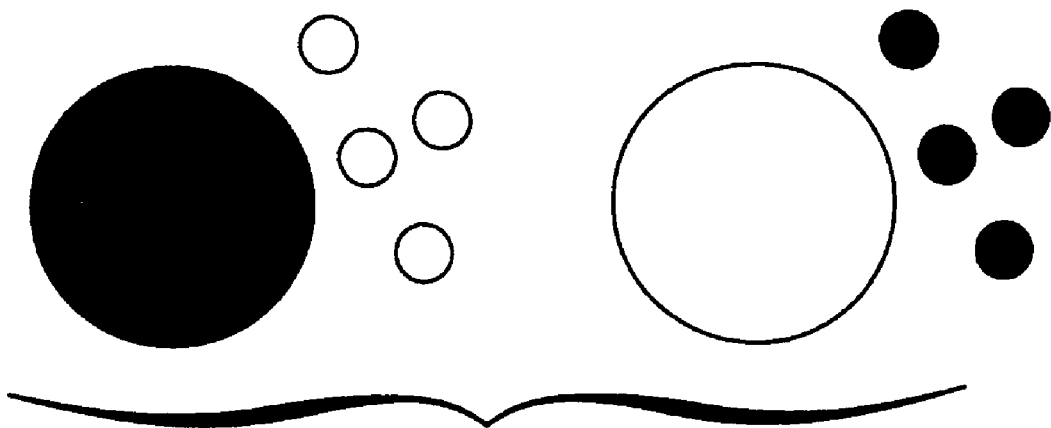

AQUEOUS POLYMER DISPERSIONS CONTAINING ALKYLDIKETENES, METHODS FOR THE PRODUCTION THEREOF, AND THEIR USE

The present invention relates to alkyldiketene-containing aqueous polymer dispersions, processes for their preparation by emulsifying alkyldiketenes in water in the presence of monomers and stabilizers under the action of shear forces, and to the polymerization of the miniemulsions thus prepared and to the use of the aqueous alkyldiketene dispersions thus obtainable as sizes for paper or as water repellents for leather, natural and/or manmade fibers and textiles.

Aqueous alkyldiketene dispersions and processes for their preparation by emulsifying molten alkyldiketenes in water in the presence of cationic starch and an anionic dispersant as a stabilizer under the action of shear forces are known, cf. for example U.S. Pat. No. 3,223,544.

WO-A-94/05855 discloses paper size mixtures which are obtainable by mixing an aqueous suspension of a digested cationic starch with finely divided, aqueous polymer dispersions which are sizes for paper, and emulsifying alkyldiketenes in this mixture at at least 70° C.

WO-A-96/31650 discloses mixtures of paper sizes comprising aqueous dispersions of alkyldiketenes and finely divided, aqueous polymer dispersions which are a size for paper. The alkyldiketenes are emulsified in the presence of cationic starch having an amylopectin content of at least 95% by weight as a stabilizer in water. The polymer dispersions are prepared, for example, by copolymerizing (a) styrene, acrylonitrile and/or methacrylonitrile, (b) acrylic and/or methacrylic esters of monohydric saturated $C_3$- to $C_8$-alcohols and, if required, (c) other monoethylenically unsaturated monomers in the presence of free radical initiators by an emulsion polymerization method in an aqueous solution of a degraded starch as a protective colloid.

WO-A-00/23651 discloses aqueous, anionic size dispersions which are obtainable, for example, by dispersing alkyldiketenes in the presence of anionic dispersants as the sole stabilizer in water.

The particle sizes of the alkyldiketenes in the known aqueous alkyldiketene dispersions are, for example, from 0.5 to 5 μm.

Preparation of miniemulsions is also known. These are understood as meaning particularly finely divided emulsions of hydrophobic monomers in water. The particle size of the monomers emulsified in the aqueous phase is in the nanometer range, e.g. from 5 to 500 nm. In order to prepare, for example, a miniemulsion of styrene in water, ultrasound is allowed to act on a mixture of styrene, a surface-active agent, such as sodium dodecylsulfate, and a hydrophobic component, such as hexadecane or olive oil, for homogenization. In this way, stable miniemulsions of styrene and hydrophobic substance in water, having an average particle diameter of the emulsified oil phase of, for example, from 78 to 102 nm, are obtained, cf. K. Landfester, Macromol. Rapid Commun. 22 (2001), 896-936. These emulsions can ideally be polymerized to polymer latices, the particle size of the emulsified monomer droplets being obtained. In the miniemulsion polymerization, it is possible to incorporate water-insoluble compounds, such as alkyd resins or pigments, into the resulting latices.

It is an object of the present invention to provide size dispersions based on alkyldiketenes and improved in comparison with the prior art. Moreover, it is intended to improve the adhesion of toners to papers which were sized with such dispersions.

We have found that this object is achieved, according to the invention, by alkyldiketene-containing aqueous polymer dispersions which are obtainable by miniemulsion polymerization of hydrophobic monoethylenically unsaturated monomers in the presence of alkyldiketenes.

Such polymer dispersions are obtainable by emulsifying an organic phase which contains
- at least one alkyldiketene and
- at least one monoethylenically unsaturated hydrophobic monomer in solution, in the presence of a surface-active agent in an aqueous phase with the aid of a mechanical emulsification process with formation of a miniemulsion having a particle size of the emulsified organic phase of not more than 500 nm, at least one of the two phases additionally containing a free radical polymerization initiator or a polymerization initiator being added to the miniemulsion, and polymerizing the monomers of the miniemulsion.

The present invention also relates to a process for the preparation of alkyldiketene-containing aqueous polymer dispersions, the miniemulsion polymerization of hydrophobic monomers being carried out in the presence of alkyldiketenes. In this procedure, for example, an organic phase which contains
- at least one alkyldiketene and
- at least one monoethylenically unsaturated hydrophobic monomer in solution is emulsified in the presence of a surface-active agent in an aqueous phase with the aid of a mechanical emulsification process with formation of a miniemulsion having a particle size of the emulsified organic phase of not more than 500 nm, at least one of the two phases additionally containing a free radical polymerization initiator before the emulsification or a polymerization initiator being added to the miniemulsion, and the monomers of the miniemulsion are then polymerized.

The preferred novel polymer dispersions are obtainable by using an organic phase which comprises a solution, a binary or polynary mixture and/or a dispersion which contains
- at least one $C_{14}$- to $C_{22}$-alkyldiketene,
- at least one monomer from the group consisting of styrene, methylstyrene, $C_2$- to $C_{28}$-olefins, esters of monoethylenically unsaturated carboxylic acids of 3 to 5 carbon atoms and monohydric alcohols of 1 to 22 carbon atoms, vinyl esters of $C_1$- to $C_{22}$-carboxylic acids, preferably of $C_1$- to $C_{18}$-carboxylic acids, vinyl ethers of $C_1$- to $C_{30}$-alcohols, $C_1$- to $C_{22}$-alkyl acrylates, acrylonitrile and methacrylonitrile, and
- at least one hydrocarbon, an alcohol of 10 to 24 carbon atoms, a hydrophobic polymer having a molar mass Mw of <10 000, a tetraalkylsilane and/or a mixture of said compounds, emulsifying said organic phase in the aqueous phase with formation of a miniemulsion and then subjecting said miniemulsion to polymerization conditions in order to polymerize the monomers emulsified therein. Particularly preferred alkyldiketene-containing aqueous dispersions are those in whose preparation a solution which contains
- stearyldiketene, palmityldiketene and/or behenyldiketene,
- styrene, n-butyl acrylate, sec-butyl acrylate, tert-butyl acrylate, 2-ethylhexyl acrylate, methyl methacrylate, n-butyl methacrylate, acrylonitrile, methacrylonitrile and/or vinyl acetate and
- hexadecane, olive oil, polystyrene having a molar mass Mw of from 500 to 5000, a siloxane having a molar mass Mw of from 500 to 5000, cetyl alcohol, stearyl alcohol, palmityl alcohol, behenyl alcohol, a $C_{12}$- to $C_{22}$-alkyl acrylate, a vinyl ester of a $C_{12}$- to $C_{22}$-carboxylic acid and/or a vinyl ether of a $C_{12}$- to $C_{30}$-alcohol is used as the starting organic phase. Of particular interest are those alkyldiketene-containing aqueous polymer dispersions in whose preparation a solution which contains stearyldiketene and/or palmityldiketene and
styrene, n-butyl acrylate, tert-butyl acrylate and/or acrylonitrile is used as the organic phase.

Also of interest are alkyldiketene-containing aqueous polymer dispersions which are prepared using, as a starting material, an organic phase which additionally contains hydrophilic monomers in amounts such that the resulting copolymer has a solubility of not more than 100, preferably not more than 50, particularly preferably not more than 10, in particular not more than 1, g/l in water at 20° C. and a pH of 2. Hydrophilic monomers used are, for example, at least one compound from the group consisting of the ethylenically unsaturated carboxylic acids of 3 to 5 carbon atoms, acrylamide, methacrylamide, N-vinylformamide, vinyl ethers, 2-acrylamido-2-methylpropanesulfonic acid, vinylsulfonic acid, styrenesulfonic acid, sulfopropyl acrylate, sulfopropyl methacrylate and/or maleic anhydride. Preferably used hydrophilic monomers are acrylic acid, methacrylic acid, acrylamide and 2-acrylamido-2-methylpropanesulfonic acid.

Other polymer dispersions according to the invention are those which are obtainable by miniemulsion polymerization of hydrophobic monoethylenically unsaturated monomers, if desired additionally in the presence of at least one water-soluble and/or water-swellable polysaccharide.

Such alkyldiketene-containing aqueous polymer dispersions are obtainable by mixing the miniemulsion with an aqueous solution which contains at least one water-soluble and/or water-swellable polysaccharide, and polymerizing the monomers of the miniemulsion in the presence of the water-soluble and/or water-swellable polysaccharide.

Alkyldiketenes are known compounds. They are prepared, for example, from acyl chlorides by elimination of hydrogen chloride with tertiary amines. $C_{14}$- to $C_{22}$-alkyldiketenes are described, for example, in WO-A-96/31650, page 3, lines 31 to 46, mentioned in connection with the prior art. The alkyldiketenes can be described, for example, with the aid of the following formula:

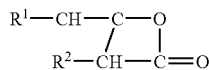

where $R^1$ and $R^2$ are $C_4$- to $C_{20}$-alkyl. Of particular industrial interest are stearyldiketene, palmityldiketene and behenyldiketene.

The miniemulsion polymerization is described in detail, for example, in the reference Macromol. Rapid Commun. 22 (2001), 896 to 993, mentioned at the outset. The substantial feature of this polymerization process is that an organic phase is distributed in particularly finely divided form in an aqueous phase which contains a surface-active agent for stabilizing the emulsion. The average particle diameter of the particles emulsified in the aqueous phase is, for example, from 50 to 500 nm, preferably from 50 to 200 nm, in particular from 50 to 100 nm. Of course, the average particle diameter of the particles emulsified in the aqueous phase can also be less than 100 nm, but not less than 10 nm. In the miniemulsion polymerization, the size of the emulsified particles or droplets virtually does not change during the polymerization in the ideal case, so that the average particle size of the polymers which are present in the aqueous polymer dispersions is likewise in the range stated for the emulsified organic phase. In addition to the pure miniemulsion polymerization, an emulsion polymerization is also observed in practice as a competing reaction. The molar masses of the polymers are in the range from 0.3 to 10 million Dalton, similar to those in the case of the emulsion polymerization.

Such small particle sizes of not more than 500 nm are achieved if the organic phase used for the preparation of the emulsion is emulsified with the aid of a mechanical emulsification process. Such processes are known. The are described in detail, for example, by H. Schubert et al., in Mischen und Rühren—Grundlagen und moderne Verfahren für die Praxis, VDI Meeting, Nov. 23-24, 1988, Baden-Baden, under Neue Entwicklungen auf dem Gebiet der Emulgiertechnik. Apparatuses used in the mechanical emulsification processes are, for example, high pressure homogenizers, ultrasound-generating apparatuses, microfluidizers, rotor-stator apparatuses, Taylor reactors, Cuette cells, nozzles and apparatuses operating with membrane technology. The essential principle of these apparatuses is based on the fact that high shear fields are built up briefly in them. The emulsification of the organic phase in the aqueous phase is preferably effected with the aid of ultrasound-generating apparatuses or with the aid of high pressure homogenizers.

Suitable hydrophobic monoethylenically unsaturated monomers which can be polymerized by a miniemulsion polymerization method are, for example, monomers from the group consisting of styrene, methylstyrene, $C_2$- to $C_{28}$-olefins, esters of monoethylenically unsaturated carboxylic acids of 3 to 5 carbon atoms and monohydric alcohols of 1 to 22 carbon atoms, vinyl esters of $C_1$- to $C_{22}$-carboxylic acids, preferably $C_1$- to $C_{18}$-carboxylic acids, vinyl ethers of $C_1$- to $C_{30}$-alcohols, $C_1$- to $C_{22}$-alkyl acrylates, acrylonitrile and methacrylonitrile. Preferably used monomers from this group are styrene, methyl methacrylate, n-butyl acrylate, isobutyl acrylate, tert-butyl acrylate and acrylonitrile or mixtures of these monomers.

The hydrophobic monomers can be used for modifying the properties of the resulting polymer minidispersions, if required together with small amounts of hydrophilic monomers. However, the hydrophilic monomers are used at most in an amount such that the resulting copolymers have a solubility of not more than 50, preferably not more than 10, especially 1, g/l in water at 20° C. and a pH of 2. Suitable hydrophilic compounds belong, for example, to the group consisting of the ethylenically unsaturated carboxylic acids of 3 to 5 carbon atoms, acrylamide, methacrylamide, N-vinylformamide, N-vinylpyrrolidone, N-vinylimidazole, vinyl ethers, 2-acrylamido-2-methylpropanesulfonic acid, vinylsulfonic acid, styrenesulfonic acid, sulfopropyl acrylate, sulfopropyl methacrylate, fumaric acid, maleic acid, itaconic acid and/or maleic anhydride. Preferred hydrophilic monomers are, for example, acrylic acid, methacrylic acid, 2-acrylamido-2-methylpropanesulfonic acid, vinylsulfonic acid, maleic anhydride and/or maleic acid.

The hydrophobic monomers can, if required, also be used together with compounds which contain at least two ethylenically unsaturated double bonds, e.g. divinylbenzene, butadiene, butanediol diacrylate, butanediol dimethacrylate, pentaerythrityl triallyl ether, methylenebisacrylamide, hexanediol dimethacrylate, trimethylolpropane triacrylate, diallyl ether, triallylamine and/or allyl acrylate. It is known that these compounds are used as crosslinking agents in polymerization reactions. In miniemulsion polymerization, they also lead to crosslinking of the polymers formed from the abovementioned hydrophobic monomers and any hydrophilic monomers used. If crosslinking agents are used, the amount of crosslinking agent is, for example, from 0.001 to 15, preferably from 0.001 to 10, particularly preferably from 0.01 to 3 and especially from 0.01 to 1, % by weight, based on the monomers used. Depending on solubility, the crosslinking agents can be added to the aqueous or the organic phase, all at once, a little at a time or by the feed procedure. They may also be added to the miniemulsion during preparation, before or during the polymerization.

A further variation of the properties of the polymers can be achieved by carrying out the miniemulsion polymerization in the presence of regulators. For this purpose, at least one regulator is added, all at once, a little at a time or by the feed procedure, preferably to the organic phase before the emulsification or to the miniemulsion at the beginning of the polymerization or during the polymerization. If regulators are used, the amounts are, for example, from 0.01 to 10, preferably from 0.1 to 2, % by weight, based on the monomers used.

In order to stabilize a miniemulsion, if required a nonpolymerizable hydrophobic compound, for example a hydrocarbon, an alcohol of 10 to 24 carbon atoms, a hydrophobic polymer having a molar mass Mw of <10 000, a tetraalkylsilane and/or a mixture of said compounds, is used in the preparation of this emulsion. Examples of such stabilizers are hexadecane, olive oil, polystyrene having a molar mass Mw of from 500 to 5000, siloxanes having a molar mass Mw of from 500 to 5000, cetyl alcohol, stearyl alcohol, palmityl alcohol and/or behenyl alcohol. It is also possible to use a water-insoluble monomer, such as, for example, a vinyl ester of a $C_{12}$- to $C_{22}$-carboxylic acid, a vinyl ether of a $C_{12}$- to $C_{30}$-alcohol and/or a $C_{12}$- to $C_{22}$-alkyl acrylate.

The organic phase which is emulsified in the aqueous phase for the preparation of the miniemulsions contains, for example, from 45 to 95, preferably from 60 to 80, % by weight of at least one hydrophobic monomer and, if required, other monomers and from 1 to 50, preferably from 5 to 40, particularly preferably from 10 to 30, % by weight of at least one alkyldiketene. If required, the organic phase may contain from 1 to 10, preferably from 2 to 5, % by weight of a nonpolymerizable hydrophobic compound or a water-insoluble monomer.

The aqueous phase which is used for the preparation of the miniemulsions comprises water and, if required, contains a surface-active agent which stabilizes the finely divided monomer droplets formed in the emulsion of the organic phase in the aqueous phase. The surface-active agent is present, for example, in amounts of from 0.05 to 10, preferably from 0.05 to 5, particularly preferably from 0.1 to 2 and especially from 0.1 to 1, % by weight in the aqueous phase, in the organic phase or in both phases. It is preferably added to the aqueous phase before the emulsification. In principle, all surface-active agents may be used. Preferably used surface-active agents are anionic compounds. Examples of suitable surface-active agents are sodium laurylsulfate, sodium dodecylsulfate, sodium hexadecylsulfate, sodium diisooctylsulfosuccinate and/or adducts of from 15 to 50 mol of ethylene oxide with 1 mol of a $C_{12}$- to $C_{22}$-alcohol.

In a preferred embodiment of the invention, the organic phase comprises a solution, a binary or polynary mixture and/or a dispersion which comprises
at least one $C_{14}$- to $C_{22}$-alkyldiketene and
at least one monomer from the group consisting of styrene, methylstyrene, $C_2$- to $C_{28}$-olefins, esters of monoethylenically unsaturated carboxylic acids of 3 to 5 carbon atoms and monohydric alcohols of 1 to 22 carbon atoms, vinyl esters of $C_1$- to $C_{18}$-carboxylic acids, acrylonitrile and methacrylonitrile.

If the monomers are not completely miscible with one another in the presence of alkyldiketenes, binary, ternary or polynary mixtures or dispersions form, which are then emulsified in the aqueous phase. This is the case particularly when the organic phase also contains hydrophilic monomers in addition to hydrophobic ones. A particularly preferred procedure is one in which the organic phase comprises a solution which contains
stearyldiketene and/or palmityldiketene and
styrene, n-butyl acrylate, tert-butyl acrylate and/or acrylonitrile.

The polymerization can also be carried out in the presence of at least one polysaccharide. The suitable polysaccharides are water-soluble or water-swellable. They are described, for example, in Römpp, Chemie Lexikon, 9th edition, Volume 5, page 3569, or in Houben-Weyl, Methoden der Organischen Chemie, 4th edition, Volume 14/2, Chapter IV, Umwandelung von Cellulose und Stärke, by E. Husemann and R. Werner, pages 862-915, and in Ullmanns Encyclopedia for Industrial Chemistry, 6th edition, Volume 28, pages 533 et seq., under Polysaccharides.

Suitable are, for example, all types of starches, for example both amylose and amylopectin, natural starches, hydrophobically and hydrophilically modified starches, anionic starches, cationically modified starches, degraded starches, it being possible for the starch degradation to be carried out, for example, oxidatively, thermally, hydrolytically or enzymatically and it being possible for both natural and modified starches to be used as starch for the starch degradation, dextrins, crosslinked, water-soluble starches which are water-swellable, as described, for example, in Ullmanns Encyclopedia of Industrial Chemistry, 6th edition, Volume 33, cf. Starch, pages 735-737.

Conventional crosslinking agents for the preparation of such starches are, for example, $POCl_3$, epichlorohydrin and mixed anhydrides. Further examples of polysaccharides are glycogens, inulins, chitins, chitosans, pectins, water-soluble cellulose derivatives, such as carboxyalkylcelluloses, cellulose sulfate, cellulosephosphoric esters, cellulose formate and hydroxyethylcelluloses, hemicelluloses, such as xylans, mannans, galactans, glycoproteins and mucopolysaccharides.

Natural, water-soluble starches, which, for example, can be converted into a water-soluble form with the aid of starch digestion, and anionically modified starches, such as oxidized potato starch, are preferably used. Anionically modified starches whose molecular weight has been decreased are particularly preferred. The decrease in the molecular weight of the starches is preferably carried out enzymatically. The average molar mass of the degraded starches is, for example, from 500 to 100 000, preferably from 1000 to 30 000. The degraded starches have, for example, an intrinsic viscosity [$\eta$] of from 0.04 to 0.5 dl/g. Such starches are described, for example, in EP-B-0 257 412 and in EP-B-0 276 770.

The preparation of the novel alkyldiketene-containing polymer dispersions can be carried out in the presence of water-soluble or water-swellable polysaccharides. It can, for example, be initially placed in an aqueous solution, if required together with at least one polymerization initiator, and heated to the temperature at which the polymerization of the monomers takes place, for example at from 50 to 100° C. The miniemulsion is then added to this solution so that the monomers contained in the miniemulsion polymerize. However, it is also possible to adopt a procedure in which the miniemulsion is prepared in the presence of at least one water-soluble polysaccharide and the miniemulsion is then subjected to the polymerization by heating it to a temperature at which the polymerization initiators contained therein or added subsequently form free radicals. In this embodiment of the novel process, the organic phase contains at least one alkyldiketene and at least one monoethylenically unsaturated hydrophobic monomer in solution, emulsification is then effected in the presence of a surface-active agent in an aqueous phase which contains at least one water-soluble and/or water-swellable polysaccharide, with the aid of mechanical emulsifying apparatuses, with formation of a miniemulsion having a particle size of the emulsified organic phase of not more than 500 nm, and the monomers of the miniemulsion are then polymerized in the presence of at least one polymerization initiator.

The miniemulsion is preferably mixed with an aqueous solution which contains a degraded starch and polymerized therein. A procedure in which the miniemulsion is mixed continuously or in portions with the aqueous solution of a polysaccharide and polymerized therein is particularly preferred. Depending on the polymerization initiators used in each case, the polymerization can be carried out, for example, at from 0 to 130° C., polymerization being effected at temperatures which are above the boiling point of the reaction mixture, under superatmospheric pressure, for example at pressures of up to 25 bar. In most cases, the polymerization is carried out at from 30 to 100° C. In order to prepare the novel polymer dispersions, for example, the miniemulsion is metered continuously or in portions into an aqueous solution of a water-soluble and/or water-swellable polysaccharide which has been heated to, for example, from 50 to 100° C. and, if required, contains at least one polymerization initiator, at a rate such that the temperature of the reaction mixture can be controlled by removing the heat of polymerization by cooling. The addition of the miniemulsion is effected at the rate of progress of the polymerization. A degraded starch is preferably used as the water-soluble polysaccharide.

The water-soluble and/or water-swellable polysaccharides are contained in the novel alkyldiketene-containing aqueous polymer dispersions in amounts of, for example, from 10 to 100, preferably from 10 to 50, particularly preferably from 15 to 40, in particular from 15 to 35, % by weight. The novel dispersions have a polymer content of, preferably, from 20 to 60, in particular from 20 to 40, % by weight and contain from 1 to 50, preferably from 5 to 50, % by weight of at least one alkyldiketene.

In order to initiate the polymerization, an initiator is generally added to one of the two phases or to both phases before the emulsification of the organic phase in the aqueous phase. If an initiator is added to the organic phase, those initiators which dissolve in the organic phase, e.g. lauroyl peroxide, are preferably used. The choice of the initiator depends on the optimum polymerization temperature. However, the addition of initiators to the aqueous phase is preferred. As a rule, water-soluble initiators, e.g. hydrogen peroxide or redox systems, preferably comprising hydrogen peroxide and a reducing agent, such as ascorbic acid, isoascorbic acid, acetone/bisulfite adducts or sodium sulfite, are used for this purpose. The amount of initiators which is used in each case in one of the two phases or in both phases is, for example, from 0.05 to 10, preferably from 0.1 to 0.5, % by weight, based on the monomers to be polymerized.

The particle size of the dispersed polymers and of the dispersed alkyldiketenes in the novel dispersions is, for example, from 50 to 500 nm, preferably from 50 to 200 nm, in general from 50 to 100 nm. Of course, the particle size of the dispersed polymers and of the dispersed alkyldiketenes in the novel dispersions can also be less than 100 nm, but not less than 10 nm.

The novel dispersions containing alkyldiketenes are used as sizes for paper, or as water repellents for leather, natural and/or manmade fibers and textiles. They can be Used both in the engine sizing of paper and in the surface sizing of paper. In each case the process chemicals customary in papermaking, such as strength agents, retention aids, drainage aids, biocides or dyes can be concomitantly used here. The novel dispersions can be used for sizing all paper grades and paper products, such as cardboard. A preferred field of use for the novel dispersions is the surface sizing of paper and paper products. Compared with papers which were sized only with conventional alkyldiketene dispersions, the papers sized with novel dispersions have the advantage that they possess excellent adhesion for toners on papers which are used for the production of copies in copiers. Since toners adhere outstandingly to these papers, the papers can also advantageously be used in laser printers.

The dispersed polymers and dispersed alkyldiketenes can occur in the novel polymer dispersions in a very wide range of morphologies (FIG. 1, white: polymer, black: alkyldiketene-containing phase).

Figure 1B:
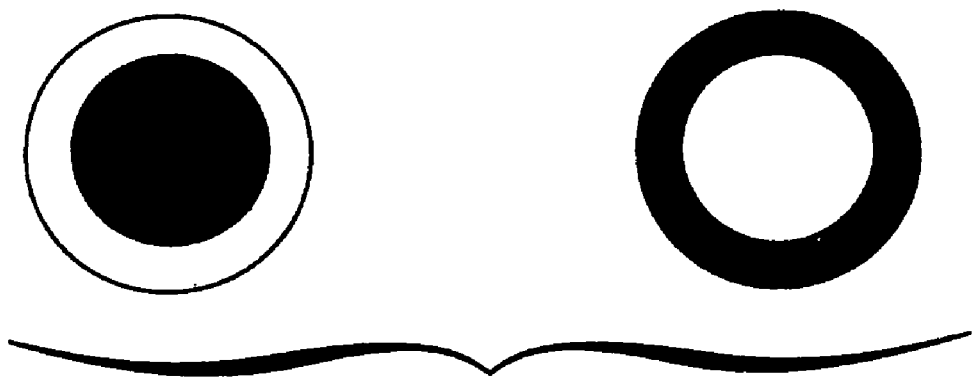
Figure 1C:
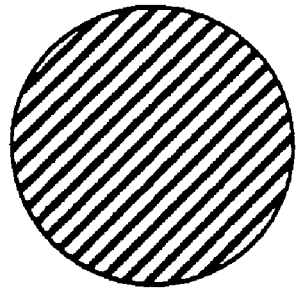
Figure 1D:
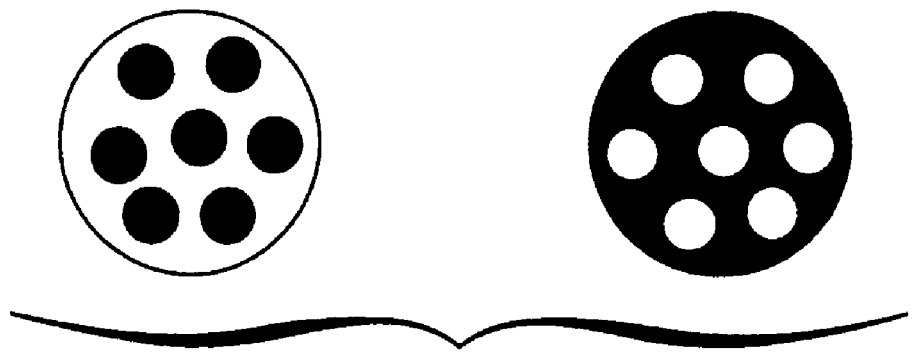
Figure 1E:
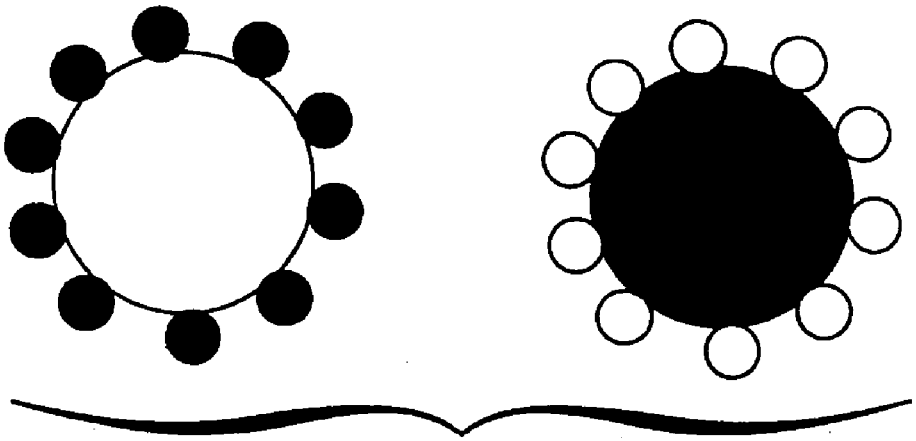
Figure 1F:
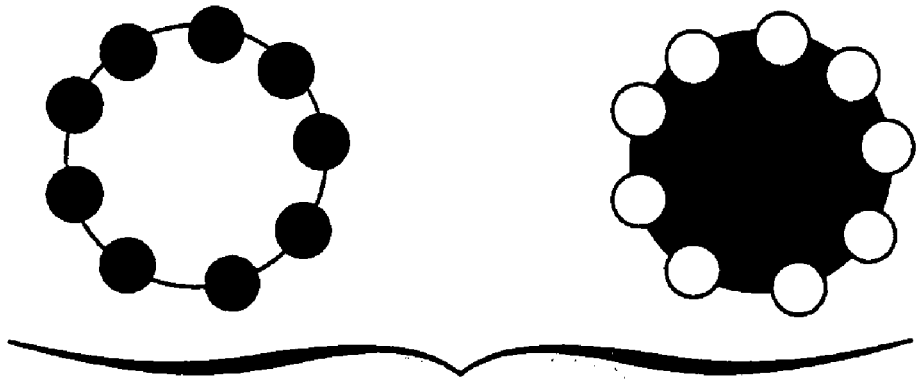
Figure 1G:
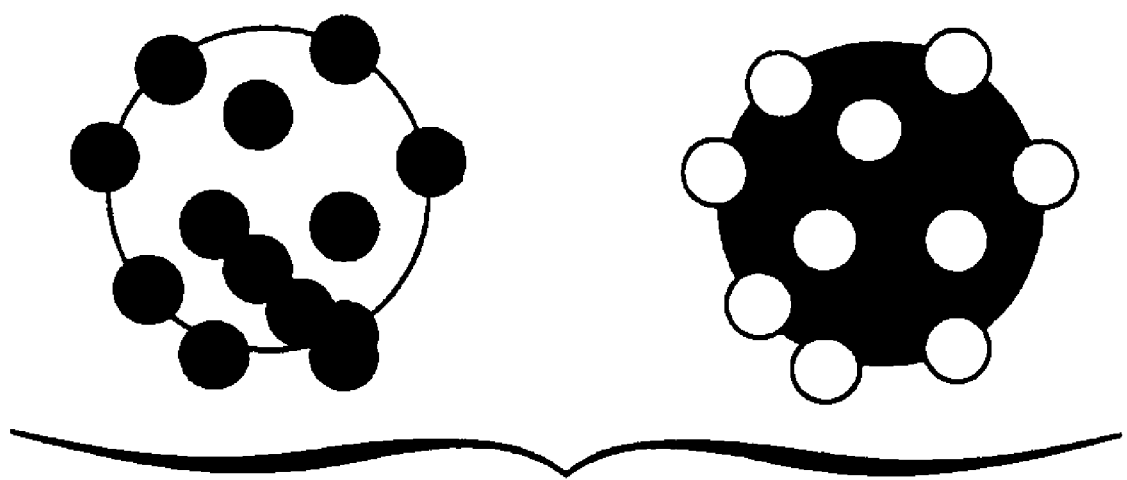

For example a complete separation of dispersed polymers and the dispersed alkyldiketene-containing particles is possible (FIG. 1a). The dispersed particles can, however, also be separated in interaction with one another. For example, a core-shell structure may be present, in which either the polymer or the alkyldiketene-containing phase forms the core and in each case the other phase forms the shell of the particles (FIG. 1b). The complete dissolution of the polymer in the alkyldiketene-containing phase, or vice versa, is also possible (FIG. 1c). Also conceivable is a domain structure in which one of the two phases, i.e. polymer or alkyldiketene-containing phase, is present as the continuous phase, and particles of the respective other phase as domains therein (FIG. 1d). A structure in which one of the two phases is present as the continuous phase while particles of the respective other phase form outside at the phase boundary is to be regarded as analogous thereto (FIG. 1e). A structure in which the particles of the respective other phase are present as domains close to the interphase is also possible (FIG. 1f). Of course, combinations are also possible; for example, particles of the respective other phase may still be present as domains within the continuous phase as well as outside at the phase boundary (FIG. 1g).

In the examples which follow, parts and percentages are by weight, unless otherwise evident from the context.

The degree of sizing was determined according to Cobb 60 and DIN EN 20 535. The HST value was determined by the Hercules Sizing Test according to Tappi standard T 530. The test for the ink flotation time was carried out according to DIN 53 126 using a blue paper test ink.

The average particle diameter of the dispersed particles of the polymer dispersions was determined both by Fraunhofer diffraction using a Coulter apparatus of type LS 230 with a small volume module unless another machine is indicated in the Examples, and by electron microscopy. The Coulter measurements were carried out in principle in about 1% strength aqueous formulations.

The toner adhesion on papers was determined according to DIN V EN V 12 283, the sheets to be tested having been conditioned according to DIN EN 20 187 and the determination of the picking being carried out according to ISO 3 783.

The polydispersity index was determined using the evaluation program of the Coulter 230 LS and the light transmittance value in a 0.1% strength aqueous solution against water.

Basoplast® 400 DS is a polymer size based on a polymer of styrene, n-butyl acrylate and tert-butyl acrylate. Basoplast® 2030 LC is a starch-stabilized alkyldiketene dispersion.

For the determination of the ink jet printability, an ink jet printer of the Desk Jet 895 type from Hewlett-Packard with standard cartridges was used. A wood-free paper having a basis weight of 60 g/m², which had been sized with the novel dispersions or with the products stated in the comparative examples, was used. In order to determine the ink jet printability, in each case a printed image was produced, on which the spread of the ink drops was assessed. The line width of the printed image is a measure of the quality of the products used in each case as size.

EXAMPLE 1

266 parts of water and 5.4 parts of a 15% strength aqueous sodium laurylsulfate solution were added to a solution of 13.5 parts of stearyldiketene in 54 parts of styrene and 2.55 parts of hexadecane and the mixture was treated with ultrasound for 8 minutes using an ultrasound finger from Dr. Hilscher. The result was a very finely divided emulsion which was stable for hours and had a particle size distribution with a median value of <100 nm. 0.26 part of ascorbic acid and 1.55 parts of 30% strength of hydrogen peroxide were then added to this emulsion, the mixture was heated to 70° C. while flushing with nitrogen and the reaction mixture was stirred for 2.5 hours at this temperature. The polymerization was virtually complete, which was shown by the solids content of a sample (nonvolatile fractions at 110° C.=19.4%). To complete the polymerization, the temperature of the batch was increased to 85° C. and stirring was effected for half an hour. During this procedure, the solids content increased to 20.1%. 0.3 parts of solid was then separated off by filtration through a 125 μm sieve and a stable polymer dispersion having a particle diameter of <100 nm was thus obtained. The polymer matrix of this dispersion had a molar mass of about 1 million D (determined with the aid of gel permeation chromatography).

EXAMPLE 2

Example 1 was repeated with the only exception that the procedure was effected in the absence of hexadecane. A stable dispersion was likewise obtained. The average particle diameter of the dispersed particles was <100 nm.

EXAMPLE 3

266 parts of water and 5.4 parts of a 15% strength sodium laurylsulfate solution were added to a solution of 13.5 parts of stearyldiketene in a mixture of 27 parts of styrene and 27 parts of n-butyl acrylate and the mixture was treated with ultrasound for 4 minutes using an ultrasound finger from Dr. Hilscher. The result was a very finely divided emulsion which was stable for hours. 0.26 part of ascorbic acid and 1.55 parts of 30% strength hydrogen peroxide were then added to this emulsion at 30° C. and the reaction mixture was heated to 70° C. while flushing with nitrogen. At this temperature, a slightly exothermic reaction began, the internal temperature increasing to 73° C. The reaction mixture was stirred for 2.5 hours at this temperature, the temperature was then increased to 85° C. and stirring was effected for a further hour at this temperature. The polymerization was virtually complete after this time (nonvolatile fractions at 110° C.=19.2%).

0.1 part of solid was then separated off by filtration through a 125 μm sieve and a dispersion having an average particle diameter of <100 nm was thus obtained.

EXAMPLE 4

266 parts of water and 1.6 parts of a 50% strength aqueous solution of sodium diisooctylsulfosuccinate were added to a solution of 13.5 parts of stearyldiketene in 54 parts of styrene and the mixture was treated with ultrasound for 4 minutes using an ultrasound finger from Dr. Hilscher. The result was a very finely divided emulsion which was stable for hours. 0.26 part of ascorbic acid and 1.55 parts of 30% strength hydrogen peroxide were then added to this emulsion at 30° C. and the emulsion was heated to 70° C. while flushing with nitrogen. At this temperature, a slightly exothermic reaction began, the internal temperature increasing to 73° C. The reaction mixture was stirred for 2.5 hours at this temperature, the temperature was then increased to 85° C. and the mixture was then stirred for a further hour at this temperature. The polymerization was virtually complete after this time (nonvolatile fractions at 110° C.=19.2%). <0.1 part of solid was separated off by filtration through a 125 μm sieve and a dispersion having an average particle diameter of 64 nm was thus obtained.

EXAMPLE 5

266 parts of water and 5.4 parts of a 15% strength aqueous sodium laurylsulfate solution were added to a solution of 27 parts of stearyldiketene in 40.5 parts of styrene and the mixture was treated with ultrasound for 4 minutes using an ultrasound finger from Dr. Hilscher. The result was a very finely divided emulsion which was stable for hours. 0.7 part of lauroyl peroxide was then added to this emulsion at 40° C., the mixture was heated to 70° C. while flushing with nitrogen and the solids content of the dispersion was determined after 2 hours. It was 15.1 %. After a reaction time of a further 3 hours, the solids content had increased to 17.7%. By adding a further 0.35 part of lauroyl peroxide and increasing the temperature to 85° C., a dispersion having a solids content of 17.9% was obtained after a reaction time of 1 hour at 85° C. 4.4 parts of solid were separated off by filtration through a 125 μm sieve and a dispersion having an average particle diameter of about 100 nm was thus obtained. The particle size distribution of the polymer dispersion was trimodal with 2 further very small maxima at 300 and 500 nm.

EXAMPLE 6

269.8 parts of water and 1.6 parts of a 50% strength aqueous diisooctyl sulfosuccinate solution were added to a solution of 13.5 parts of stearyldiketene in 13.5 parts of styrene, 13.5 parts of n-butyl acrylate, 13.5 parts of tert-butyl acrylate and 13.5 parts of acrylonitrile and the mixture was treated with ultrasound for 4 minutes using an ultrasound finger from Dr. Hilscher. The result was a very finely divided emulsion which was stable for hours and had a particle size distribution with a median value of <100 nm. 0.26 part of ascorbic acid and 1.55 parts of 30% strength hydrogen peroxide were then added to this emulsion and the emulsion was heated to 70° C. while flushing with nitrogen and this temperature was maintained for 2 hours. Thereafter, the temperature was brought to 85° C. and kept there for 1 hour. The polymerization was virtually complete, which was shown by means of the solids content of a sample (nonvolatile fractions at 120° C./30 min=17.9%). In order to complete the polymerization, 0.065 part of ascorbic acid and 0.4 part of 30% strength aqueous $H_2O_2$ were added to 170 parts of the above dispersion and the dispersion was stirred for a further hour at 85° C. under a nitrogen atmosphere. During this procedure, the solids content increased to 19.0%. 0.1 Part of the solid was then separated off by filtration through a 125 μm sieve and a dispersion having a particle diameter of <100 nm was thus obtained, said particle diameter being determined by Fraunhofer diffraction using a Coulter apparatus of type LS 230 with a small volume module.

COMPARATIVE EXAMPLE 1

Example 1 was repeated with the only exception that the procedure was effected in the absence of stearyldiketene. A dispersion having an average particle size of about 200 nm was obtained.

USE EXAMPLES

EXAMPLES 7 TO 18

The minidispersions prepared by the examples and the comparative example were each tested as surface sizes. First, a 10% strength solution of a potato starch in water was prepared. In each case 2 g/l or 4 g/l, based in each case on the solids content, of a polymer dispersion prepared according to examples 1 to 6 and comparative example 1 were then added to this starch solution and mixing was effected. The dispersions thus prepared were each applied by means of a size press to an unsized, wood-free paper which had a basis weight of 80 g/m². The size dispersion absorbed by the paper was about 60-62% of the sheet weight. Thereafter, the papers treated in this manner were dried, conditioned for 24 hours at 50% relative humidity and then investigated with regard to the sizing. The results are shown in table 1.

COMPARATIVE EXAMPLES 2 TO 4

The products shown in table 1 were investigated for sizing effect by the method stated in examples 7 to 18. The results are shown in table 1.

TABLE 1

Sizing effect of the dispersions

| | Size | Amount of polymer [g/l] | Cobb 60 (g/m²) | Ink flotation test (seconds) | HST (seconds) |
|---|---|---|---|---|---|
| Comparative example | | | | | |
| 2 | Starch | — | 125 | 0 | 0 |
| 3 | Starch/Basoplast 400 DS | 2 | 42 | 8 | 56 |
| 4 | Starch/Basoplast 400DS | 4 | 28 | 32 | 265 |
| 5 | Polymer obtained according to comparative example 1 | 2 | 108 | 0 | |
| 6 | Polymer obtained according to comparative example 1 | 4 | 100 | 0 | |
| Example | | | | | |
| 7 | Starch/polymer obtained according to example 1 | 2 | 29 | | 87 |
| 8 | Starch/polymer obtained according to example 1 | 4 | 23 | | 299 |
| 9 | Starch/polymer obtained according to example 2 | 2 | 27 | | 112 |
| 10 | Starch/polymer obtained according to example 2 | 4 | 23 | | 302 |
| 11 | Starch/polymer obtained according to example 3 | 2 | 23 | 16 | |
| 12 | Starch/polymer obtained according to example 3 | 4 | 22 | 36 | |
| 13 | Starch/polymer obtained according to example 4 | 2 | 29 | 4 | |
| 14 | Starch/polymer obtained according to example 4 | 4 | 22 | 35 | |
| 15 | Starch/polymer obtained according to example 5 | 2 | 24 | 22 | |
| 16 | Starch/polymer obtained according to example 5 | 4 | 21 | 40 | |
| 17 | Starch/polymer obtained according to example 6 | 2 | 29 | 35 | |
| 18 | Starch/polymer obtained according to example 6 | 4 | 27 | 50 | |

Basoplast$^R$ 400DS is a polymer size based on a polymer of styrene, n-butyl acrylate and tert-butyl acrylate.

EXAMPLES 19 TO 22

20%, based on fiber, of milled calcium carbonate were metered into a 0.8% strength slurry of a mixture of birch sulfate and pine sulfate in water. In each case 0.5% of a cationic cornstarch, the sizes stated in table 2 in the stated concentrations and 0.025% of a retention aid (anionic polyacrylamide) were then added. Laboratory sheets having a basis weight of 80 g/m² were produced in a Rapid-Köthen sheet former from the paper stocks obtained in each case, dried, conditioned for 24 hours at 50% relative humidity and then investigated with regard to the sizing. The results are shown in table 2.

TABLE 2

| | Size | Amount of size [%] | Cobb 60 (9 g/m²) | HST (seconds) |
|---|---|---|---|---|
| Comparative example | | | | |
| 7 | Starch/Basoplast 2030LC | 0.06 | 25 | 235 |
| 8 | Starch/Basoplast 2030LC | 0.1 | 22 | 415 |
| Example | | | | |
| 19 | Starch/polymer according to example 1 | 0.06 | 26 | 201 |

TABLE 2-continued

| | Size | Amount of size [%] | Cobb 60 (9 g/m$^2$) | HST (seconds) |
|---|---|---|---|---|
| 20 | Starch/polymer according to example 1 | 0.1 | 23 | 378 |
| 21 | Starch/polymer according to example 2 | 0.06 | 25 | 218 |
| 22 | Starch/polymer according to example 2 | 0.1 | 22 | 409 |

Basoplast ® 2030 LC is an engine size based on stearyldiketene

Application test for toner adhesion:

The dispersions prepared according to examples 1 to 6 were tested in each case as a means for improving the toner adhesion. A 12% strength solution of a potato starch in water was first prepared. 4 g/l, based in each case on the solids content, of a polymer dispersion prepared according to examples 1 to 6 were then added to this starch solution and mixing was effected. The preparations (dispersions) thus produced were each applied by means of a size press to a slightly sized, wood-free paper which had a basis weight of 80 g/m$^2$ and a Cobb 60 of 31 g/m$^2$. The amount of size dispersion absorbed by the paper was about 50-55% of the sheet weight. Thereafter, the papers thus treated were dried, conditioned for 24 hours at 50% relative humidity and then investigated with regard to the toner adhesion. The results are shown in table 3.

In addition, a 12% strength aqueous solution of a potato starch was tested as comparative example 9 and a preparation of a 12% strength aqueous solution of a potato starch containing 4 g/l, based on polymer, of Basoplast® 400DS was tested as comparative example 10. The results are shown in table 3.

TABLE 3

Toner adhesion of the dispersions

| | Size | Amount of polymer [g/l] | Toner adhesion [%] |
|---|---|---|---|
| Comparative example | | | |
| 9 | Starch | — | 56 |
| 10 | Starch/Basoplast 400DS | 4 | 65 |
| Example | | | |
| 23 | Starch/polymer obtained according to example 1 | 4 | 67 |
| 24 | Starch/polymer obtained according to example 2 | 4 | 72 |
| 25 | Starch/polymer obtained according to example 3 | 4 | 85 |
| 26 | Starch/polymer obtained according to example 4 | 4 | 75 |
| 27 | Starch/polymer obtained according to example 5 | 4 | 82 |
| 28 | Starch/polymer obtained according to example 6 | 4 | 88 |

EXAMPLE 29

Preparation of a Miniemulsion 5511 g of water, 113.6 g of a 15% strength aqueous sodium laurylsulfate solution and a solution of 355 g of pelletized alkylketene dimer (mixture of 50% of palmitylketene dimer and 50% of stearylketene dimer), 354.6 g of tert-butyl acrylate, 354.6 g of n-butyl acrylate and 710.4 g of styrene were emulsified twice at 300 bar using an APV-Gaulin high-pressure homogenizer at room temperature. This emulsion was stored for 24 hours at room temperature and then used for the polymerization. The drop size of the miniemulsion was 146 nm (average diameter), measured using a Coulter N4 Plus apparatus. The polydispersity index was 0.2. The light transmittance value was determined as 86.6%.

Preparation of the Dispersion

In a 2 l reactor stirred at 200 rpm, 418 g of water, 70.3 g of an oxidized potato starch from Südstärke and 1.4 g of calcium acetate hydrate were heated to 85° C. Thereafter, 3.5 g of an amylase (Termamyl 120 L from Novo Nordisk) were added and the mixture was stirred for 18 minutes at 85° C. After this time, the degradation of the starch was stopped by adding 18 g of glacial acetic acid, 3.5 g of iron(II) heptahydrate and 2.8 g of a mixture of 23.3 g of water and 11.7 g of 30% strength hydrogen peroxide (initiator 1). 1216 g of the above-described miniemulsion from example 29 were then metered continuously in the course of 120 minutes at 85° C. At the same time, the continuous feeding of 32.2 g of initiator 1 was begun, and said initiator was added within a period of 150 minutes. After the end of the initiator feed, the reaction mixture was stirred for a further 30 minutes at 85° C. and then cooled to 50° C., 3.5 g of a 10% strength aqueous tert-butyl hydroperoxide solution were added and stirring was effected for 60 minutes at 50° C. The reaction mixture was then cooled to room temperature and filled.

1769.5 g of a dispersion having a particle size of 73 nm (median value of a Coulter 230 LS measurement) and a solids content of 18% were thus obtained. The content of residual monomers was: styrene <10 ppm, tert-butyl acrylate <10 ppm and n-butyl acrylate <60 ppm.

EXAMPLE 30

Preparation of the Miniemulsion 2587.3 g of water, 53.3 g of a 15% strength aqueous sodium laurylsulfate solution and a solution of 166.7 g of pelletized alkylketene dimer (mixture of 50% of palmityldiketene and 50% of stearyidiketene) in 666.6 g of styrene were emulsified twice at 300 bar using an APV Gaulin high-pressure homogenizer. This emulsion was then used for the polymerization.

The drop size of the miniemulsion was 170 nm (average diameter). The polydispersity index was 0.14 and the light transmittance value was determined as 45.6%.

Preparation of the Dispersion

In a 2 l reactor stirred at 200 rpm, 282.7 g of water, 50.21 g of an oxidized wheat starch from Südstärke and 1.0 g of calcium acetate hydrate were heated to 85° C., 2.5 g of an amylase (Termamyl 120 L from Novo Nordisk) were then added and the mixture was stirred for 18 minutes at 85° C. After this time, the degradation of the starch was stopped by adding 10 g of glacial acetic acid, 2.5 g of iron(ll) heptahydrate and 2.0 g of a mixture of 16.65 g of water and 8.33 9 of 30% strength hydrogen peroxide (initiator 1). Immediately thereafter, 868.5 g of the above-described miniemulsion from example 30 were metered continuously in the course of 120 minutes at 85° C. Simultaneously with the beginning of the feeding of the miniemulsion, 23 g of initiator 1 were added continuously in the course of 150 minutes. The feeding of a mixture of 22.5 g of water and 2.5 g of ascorbic acid (initiator 2) was also begun simultaneously therewith, and said feed was distributed over 150 minutes. After the end of the initiator feed, the reaction mixture was stirred for 30 minutes at 85° C. and then cooled to 50° C., 10 g of tert-butyl hydroperoxide were added and stirring was then effected for 60 minutes at 50° C. The reaction mixture was then cooled to room temperature and filled.

1282.2 g of a dispersion having a particle size of 126 nm and a solids content of 18.4% were thus obtained. The content of residual styrene was <400 ppm.

COMPARATIVE EXAMPLE 11

Example 30 was repeated with the only exception that the miniemulsion contained no alkylketene dimer. A stable dispersion having a particle size of the dispersed particles of 152 nm and a solids content of 19.5% was likewise obtained. The content of residual styrene was <500 ppm.

USE EXAMPLES

The minidispersions prepared according to examples 29 and 30 were tested in each case as surface sizes and as engine sizes and compared with commercial products (Basoplast 400 DS and 2030 LC). In addition, the ink jet printability of papers which had been sized with the novel minidispersions and with said commercial sizes was tested.

COMPARATIVE EXAMPLE 12

A 6% strength solution of a potato starch in water was first prepared, and this solution was applied with the aid of a size press to wood-free papers having a basis weight of 60 g/m$^2$ and 80 g/m$^2$ so that the amount of starch solution absorbed was about 60 to 62% of the sheet weight. The sizing effect achievable with this solution is shown in table 1.

COMPARATIVE EXAMPLES 13-25

In each case, the amounts of the commercial sizes Basoplast® 400 DS and Basoplast® 2030 LC stated in tables 4 and 5, based in each case on the solids content, were then added to the starch solution according to comparative example 12. In each case the sizing effect of the mixtures thus obtained were then determined by applying them by means of a size press to two different wood-free papers having basis weights of 60 and 80 g/m$^2$. The size dispersion absorbed by the paper was about 60-62% of the sheet weight. Thereafter, the papers treated in this manner were conditioned for 24 hours at 50% relative humidity and then investigated with regard to the sizing. The results are shown in tables 4 and 5.

EXAMPLES 31 TO 38

The amounts, based in each case on the solids content, of polymer dispersions prepared according to examples 29 and 30 and according to comparative example 11, which amounts are shown in tables 4 and 5, were added to the starch solution according to comparative example 12 and mixed. The dispersions thus prepared were applied in each case by means of a size press to two different wood-free papers having basis weights of 60 and 80 g/m$^2$. The size dispersion absorbed by the paper was about 60-62% of the sheet weight. Thereafter, the papers treated in this manner were conditioned for 24 hours at 50% relative humidity and then investigated with regard to the sizing. The results are shown in tables 4 and 5.

TABLE 4

Sizing effect of the dispersions on a wood-free paper having a basis weight of 60 g/m$^2$

| Size | | Amount of starch/polymer [g/l] | Cobb 60 (g/m$^2$) | Ink flotation test (seconds) |
|---|---|---|---|---|
| | Comparative examples | | | |
| Starch | 12 | 60 | 66 | 0 |
| Starch/Basoplast 400DS | 13 | 3 | 34 | 1 |
| Starch/Basoplast 400DS | 14 | 6 | 32 | 1 |
| Starch/Basoplast 2030 LC | 15 | 1.5 | 27 | 2 |
| Starch/Basoplast 2030 LC | 16 | 3 | 25 | 10 |
| Starch/polymer obtained according to comparative example 11 | 17 | 3 | 80 | 0 |
| Starch/polymer obtained according to comparative example 11 | 18 | 6 | 78 | 0 |
| | Examples | | | |
| Starch/polymer obtained according to example 29 | 31 | 3 | 37 | 2 |
| Starch/polymer obtained according to example 29 | 32 | 6 | 27 | 4 |
| Starch/polymer obtained according to example 30 | 33 | 3 | 29 | 3 |
| Starch/polymer obtained according to example 30 | 34 | 6 | 25 | 6 |

TABLE 5

Sizing effect of the dispersions on a wood-free paper having a basis weight of 80 g/m$^2$

| Size | | Amount of starch/polymer [g/l] | Cobb 60 (g/m$^2$) |
|---|---|---|---|
| | Comparative example | | |
| Starch | 19 | 60 | 29 |
| Starch/Basoplast 400DS | 20 | 3 | 22 |
| Starch/Basoplast 400DS | 21 | 6 | 22 |
| Starch/Basoplast 2030 LC | 22 | 1.5 | 27 |
| Starch/Basoplast 2030 LC | 23 | 3 | 22 |
| Starch/polymer obtained according to comparative example 11 | 24 | 3 | 80 |
| Starch/polymer obtained according to comparative example 11 | 25 | 6 | 76 |
| | Examples | | |
| Starch/polymer obtained according to example 29 | 35 | 3 | 22 |
| Starch/polymer obtained according to example 29 | 36 | 6 | 25 |
| Starch/polymer obtained according to example 30 | 37 | 3 | 22 |
| Starch/polymer obtained according to example 30 | 38 | 6 | 22 |

EXAMPLES 39 TO 42 AND COMPARATIVE EXAMPLES 26 TO 29

20% of ground calcium carbonate, based on fibers are metered into 0.8% strength slurry of a mixture of birch and pine sulfate pulp in water. In each case 0.5% of a cationic cornstarch, the solvents shown in table 4, in. the stated concentrations, and 0.025% of a retention aid (anionic polyacrylamide) were then added. Laboratory sheets having a basis weight of 80 g/m² were produced from the paper stocks obtained in each case, in a Rapid-Köthen sheet former, and were dried, conditioned for 24 hours at 50% relative humidity and then investigated with regard to the sizing. The results are shown in table 6.

TABLE 6

Engine sizing with the dispersions on a bleached pulp

| | Size | Amount of size [%] | Cobb 60 [g/m²] |
|---|---|---|---|
| Examples | | | |
| 39 | Starch/polymer according to example 29 | 0.06 | 26 |
| 40 | Starch/polymer according to example 29 | 0.1 | 23 |
| 41 | Starch/polymer according to example 30 | 0.06 | 25 |
| 42 | Starch/polymer according to example 30 | 0.1 | 22 |
| Comparative examples | | | |
| 26 | Starch/polymer according to comparative example 11 | 0.06 | 100 |
| 27 | Starch/polymer according to comparative example 11 | 0.1 | 100 |
| 28 | Starch/Basoplast 2030 LC | 0.06 | 25 |
| 29 | Starch/Basoplast 2030 LC | 0.1 | 22 |

Testing for Ink Jet Printability

The dispersions prepared according to the examples and the comparative examples were tested in each case as compositions for improving the ink jet printability. The results are shown in table 7.

TABLE 7

Ink jet tests

| | Size | Amount of polymer [g/l] | Line width Black [μm] | Line width Magenta [μm] | Line width Cyan [μm] |
|---|---|---|---|---|---|
| Comparative examples | | | | | |
| 30 | Starch | 60 | 580 | 382 | 234 |
| 31 | Starch/Basoplast 400 DS | 6 | 564 | 376 | 224 |
| 32 | Starch/Basoplast 2030 LC | 3 | 554 | 357 | 179 |
| 33 | Starch/polymer obtained according to comparative example 11 | 6 | 579 | 385 | 237 |
| Examples | | | | | |
| 43 | Starch/polymer obtained according to example 29 | 6 | 556 | 355 | 185 |
| 44 | Starch/polymer obtained according to example 30 | 6 | 565 | 362 | 204 |

We claim:

1. An alkyldiketene-containing aqueous polymer dispersion, obtained by aqueous emulsion polymerization of at least one hydrophobic monoethylenically unsaturated monomer in the presence of at least one alkyldiketene, wherein the at least one hydrophobic monoethylenically unsaturated monomer and the at least one alkyldiketene have an average particle diameter of 10 to 500 nm.

2. The polymer dispersion of claim 1, obtained by emulsifying an organic phase comprising the at least one alkyldiketene and the at least one monoethylenically unsaturated hydrophobic monomer and polymerizing the monomers.

3. The polymer dispersion of claim 2, wherein the organic phase is emulsified in the aqueous phase by the action of ultrasound or with the aid of a high pressure homogenizer.

4. The polymer dispersion of claim 2, wherein the organic phase further comprises an additional nonpolymerizable hydrophobic compound.

5. The polymer dispersion of claim 4, wherein the organic phase comprises, as the nonpolymerizable hydrophobic compound, a hydrocarbon, an alcohol of 10 to 24 carbon atoms, a hydrophobic polymer having a molar mass Mw of <10 000, a tetraalkylsilane and/or a mixture thereof.

6. The polymer dispersion of claim 2, wherein the organic phase further comprises a member selected from the group consisting of vinyl esters of $C_{12}$-$C_{22}$-carboxylic acids, vinyl ethers of $C_{12}$-$C_{30}$-alcohols and $C_{12}$-$C_{22}$-alkyl acrylates.

7. The polymer dispersion of claim 2, wherein the organic phase comprises a solution, a binary or polynary mixture and/or a dispersion, wherein the solution, a binary or polynary mixture and/or a dispersion comprises at least one $C_{14}$- to $C_{22}$-alkyldiketene, at least one monomer selected from the group consisting of styrene, methylstyrene, $C_2$- to $C_{28}$-olefins, esters of monoethylenically unsaturated carboxylic acids of 3 to 5 carbon atoms and monohydric alcohols of 1 to 22 carbon atoms, vinyl esters of $C_1$- to $C_{18}$-carboxylic acids, acrylonitrile and methacrylonitrile, and at least one hydrocarbon, an alcohol of 10 to 24 carbon atoms, a hydrophobic polymer having a molar mass Mw of <10 000, a tetraalkylsilane, a vinyl ester of $C_{12}$-$C_{22}$-carboxylic acids, a vinyl ether of $C_{12}$-$C_{30}$-alcohols, a $C_{12}$-$C_{22}$-alkyl acrylate and/or a mixture thereof.

8. The polymer dispersion of claim 2, wherein the organic phase comprises a solution which comprises stearyldiketene, palmityldiketene and/or behenyldiketene, styrene, n-butyl acrylate, sec-butyl acrylate, tert-butyl acrylate, 2-ethylhexyl acrylate, methyl methacrylate, n-butyl methacrylate, acrylonitrile, methacrylonitrile and/or vinyl acetate and hexadecane, olive oil, polystyrene having a molar mass Mw of from 500 to 5000, siloxanes having a molar mass Mw of from 500 to 5000, cetyl alcohol, stearyl alcohol, palmityl alcohol, behenyl alcohol, vinyl esters of $C_{12}$-$C_{22}$-carboxylic acids, vinyl ethers of $C_{12}$-$C_{30}$-alcohols and/or $C_{12}$-$C_{22}$-alkyl acrylates.

9. The polymer dispersion of claim 2, wherein the organic phase comprises a solution which comprises stearyldiketene and/or palmityldiketene and styrene, n-butyl acrylate, tert-butyl acrylate and/or acrylonitrile.

10. The polymer dispersion of claim 2, wherein the organic phase further comprises hydrophilic monomers in amounts such that the resulting copolymers have a solubility of not more than 10, g/l in water at 20° C. and a pH of 2.

11. The polymer dispersion of claim 10, wherein at least one compound selected from the group consisting of the ethylenically unsaturated carboxylic acids of 3 to 5 carbon atoms, acrylamide, methacrylamide, N-vinylformamide, vinyl ethers, 2-acrylamido-2-methylpropane-sulfonic acid, vinylsulfonic acid, styrenesulfonic acid, sulfopropyl acrylate, sulfopropyl methacrylate, fumaric acid, maleic acid, itaconic acid, maleic anhydride, and mixtures thereof is used as the hydrophilic monomer.

12. A method for applying a composition on a surface, comprising:
applying the aqueous polymer dispersion of claim 2 on an article,
wherein the article is paper, leather, natural fibers, natural textiles, manmade fibers, manmade textiles, or a mixture thereof.

13. The polymer dispersion of claim 1, obtained by emulsifying an organic phase comprising the at least one alkyldiketene and the at least one monoethylenically unsaturated hydrophobic monomer in solution, in the presence of a surface-active agent in an aqueous phase with the aid of a mechanical emulsification process, at least one of the organic phase and the aqueous phase additionally comprising a free radical polymerization initiator or a polymerization initiator, and then polymerizing the monomers.

14. The polymer dispersion of claim 1, obtained by polymerization in the presence of at least one water-soluble and/or water-swellable polysaccharide.

15. The polymer dispersion of claim 14, obtained by mixing the emulsion with an aqueous solution which comprises at least one water-soluble and/or water-swellable polysaccharide, and polymerizing the monomers of the emulsion in the presence of the water-soluble and/or water-swellable polysaccharide.

16. The polymer dispersion of claim 1, wherein the at least one hydrophobic monoethylenically unsaturated monomer and the at least one alkyldiketene have an average particle diameter of 50 to 500 nm.

17. The polymer dispersion of claim 1, wherein the at least one hydrophobic monoethylenically unsaturated monomer and the at least one alkyldiketene have an average particle diameter of 50 to 200 nm.

18. The polymer dispersion of claim 1, wherein the at least one hydrophobic monoethylenically unsaturated monomer and the at least one alkyldiketene have an average particle diameter of 50 to 100 nm.

19. A process for the preparation of an alkyldiketene-containing aqueous polymer dispersion, comprising aqueous emulsion polymerizing at least one hydrophobic monoethylenically unsaturated monomer in the presence of at least one alkyldiketene, wherein the at least one hydrophobic monoethylenically unsaturated monomer and the at least one alkyldiketene have a particle size of 10 to 500 nm.

20. The process of claim 19, comprising emulsifying an organic phase comprising the at least one alkyldiketene and the at least one monoethylenically unsaturated hydrophobic monomers and polymerizing the monomers.

21. The process of claim 20, wherein the organic phase further comprises at least one additional nonpolymerizable hydrophobic compound.

22. The process of claim 20, wherein the organic phase further comprises a member selected from vinyl esters of $C_{12}$-$C_{22}$-carboxylic acids, vinyl ethers of $C_{12}$-$C_{30}$-alcohols and $C_{12}$-$C_{22}$-alkyl acrylates.

23. The process of claim 20, wherein the organic phase comprises a solution, a binary or polynary mixture and/or a dispersion, wherein the solution, a binary or polynary mixture and/or a dispersion comprises
at least one $C_{14}$- to $C_{22}$-alkyldiketene and
at least one monomer selected from the group consisting of styrene, methylstyrene, $C_2$- to $C_{28}$-olefins, esters of monoethylenically unsaturated carboxylic acids of 3 to 5 carbon atoms and monohydric alcohols of 1 to 22 carbon atoms, vinyl esters of $C_1$- to $C_{22}$-carboxylic acids, acrylonitrile and methacrylonitrile.

24. The process of claim 20, wherein the organic phase comprises a solution which comprises
stearyldiketene and/or palmityldiketene and
styrene, n-butyl acrylate, tert-butyl acrylate and/or acrylonitrile.

25. The process of claim 20, wherein the organic phase comprises
at least one alkyldiketene and
at least one monoethylenically unsaturated hydrophobic monomer and is emulsified in the presence of a surface-active agent in an aqueous phase with the aid of a mechanical emulsification process, at least one of the organic phase and the aqueous phase additionally comprising a free radical polymerization initiator or a polymerization initiator, and then,
the monomers are polymerized.

26. The process of claim 19, wherein the aqueous phase comprises a surface-active anionic compound.

27. The process of claim 19, wherein the aqueous phase comprises, as a surface-active agent, sodium laurylsulfate, sodium dodecylsulfate, sodium hexadecylsulfate, sodium dioctylsulfosuccinate and/or at least one adduct of from 15 to 50 mol of ethylene oxide with 1 mol of a $C_{12}$- to $C_{22}$-alcohol.

28. The process of claim 19, wherein the organic phase further comprises hydrophilic monomers in an amount such that the resulting copolymers have a solubility of not more than 10, g/l in water at 20° C. and a pH of 2.

29. The process of claim 28, wherein at least one compound selected from the group consisting of the ethylenically unsaturated carboxylic acids of 3 to 5 carbon atoms, acrylamide, methacrylamide, N-vinylformamide, vinyl ethers, 2-acrylamido-2-methylpropanesulfonic acid, vinylsulfonic acid, styrenesulfonic acid, sulfopropyl acrylate, sulfopropyl methacrylate, fumaric acid, maleic acid, itaconic acid, maleic anhydride, and mixtures thereof is used as the hydrophilic monomer.

30. The process of claim 19, wherein the polymerization is carried out in the presence of at least one water-soluble and/or water-swellable polysaccharide.

31. The process of claim 30, wherein the emulsion is mixed with an aqueous solution which comprises an aqueous starch and the mixture is polymerized in the presence of at least one polymerization initiator.

32. The process of claim 31, wherein the emulsion is mixed with an aqueous solution which comprises a degraded starch in solution.

33. The process of claim 31, wherein the emulsion is mixed continuously or batchwise with the aqueous solution of a water-soluble polysaccharide and polymerized.

34. The process of claim 31, wherein the water-soluble polysaccharide used is a degraded starch.

35. The process of claim 19, wherein the at least one hydrophobic monoethylenically unsaturated monomer and the at least one alkyldiketene have an average particle diameter of 50 to 500 nm.

36. The process of claim 19, wherein the at least one hydrophobic monoethylenically unsaturated monomer and the at least one alkyldiketene have an average particle diameter of 50 to 200 nm.

37. The process of claim 19, wherein the at least one hydrophobic monoethylenically unsaturated monomer and the at least one alkyldiketene have an average particle diameter of 50 to 100 nm.

* * * * *